(12) United States Patent
Prentice et al.

(10) Patent No.: US 8,760,527 B2
(45) Date of Patent: *Jun. 24, 2014

(54) EXTENDING A DIGITAL CAMERA FOCUS RANGE

(75) Inventors: Wayne E. Prentice, Honeoye Falls, NY (US); Thomas Anthony Napoli, Rochester, NY (US)

(73) Assignee: Apple Inc., Cupertino, CA (US)

( * ) Notice: Subject to any disclaimer, the term of this patent is extended or adjusted under 35 U.S.C. 154(b) by 322 days.

This patent is subject to a terminal disclaimer.

(21) Appl. No.: 13/167,846

(22) Filed: Jun. 24, 2011

(65) Prior Publication Data

US 2012/0327266 A1 Dec. 27, 2012

(51) Int. Cl.
*H04N 5/228* (2006.01)
*G03B 13/00* (2006.01)
*H04N 5/238* (2006.01)

(52) U.S. Cl.
USPC .......... 348/221.1; 348/345; 348/363

(58) Field of Classification Search
USPC ......... 348/208.12, 220.1, 345, 348–357, 361, 348/363; 396/64, 89, 102, 170, 237, 257, 396/461, 505, 509
See application file for complete search history.

(56) References Cited

U.S. PATENT DOCUMENTS

| 3,971,065 | A | 7/1976 | Bayer |
| 4,311,371 | A | 1/1982 | Kobori |
| 4,642,678 | A | 2/1987 | Cok |
| 4,774,574 | A | 9/1988 | Daley et al. |
| 5,130,739 | A | 7/1992 | OSuch |
| 5,170,202 | A * | 12/1992 | Bell ................................ 396/80 |
| 5,189,511 | A | 2/1993 | Parulski et al. |
| 5,493,335 | A | 2/1996 | Parulski et al. |
| 5,579,049 | A | 11/1996 | Shimaya |
| 5,652,621 | A | 7/1997 | Adams, Jr. et al. |
| 5,668,597 | A | 9/1997 | Parulski et al. |
| 6,192,162 | B1 | 2/2001 | Hamilton, Jr. et al. |

(Continued)

FOREIGN PATENT DOCUMENTS

| JP | H0246423 A | 2/1990 |
| JP | 2001116980 A | 4/2001 |

OTHER PUBLICATIONS

Bruce Pillman: "Camera Exposure Determination Based on a Psychometric quality Model," Signal Processing Systems (SIPS) 2010 IEEE Workshop on, Oct. 6, 2010-Oct. 8, 2010, pp. 339-344, XP002670115, ISSN: 1520-6130 Paragraph [0005]; figure 8.

*Primary Examiner* — Aung S Moe
*Assistant Examiner* — Euel Cowan
(74) *Attorney, Agent, or Firm* — Wong, Cabello, Lutsch, Rutherford & Brucculeri, LLP (57) ABSTRACT

A method for controlling a digital camera system having an optical system with an F/# that can be varied between a minimum F/# and a maximum F/#, comprising: setting the optical system F/# to a first F/#; capturing an evaluation image of the scene; analyzing the evaluation image to determine whether a subject is acceptably focused; if the subject is acceptably focused setting a capture F/# to be equal to the first F/#, otherwise the optical system F/# is iteratively increased until the subject is determined to be acceptably focused, or until a maximum F/# is reached; determining a capture F/# responsive to the F/# where the subject is acceptably focused; setting the optical system to use the capture F/#; capturing an archival image of the scene using the image sensor; and storing the captured archival image in a storage memory.

23 Claims, 4 Drawing Sheets

(56) References Cited

U.S. PATENT DOCUMENTS

| | | |
|---|---|---|
| 6,282,317 B1 | 8/2001 | Luo et al. |
| 6,292,218 B1 | 9/2001 | Parulski et al. |
| 6,535,636 B1 | 3/2003 | Savakis et al. |
| 6,697,502 B2 | 2/2004 | Luo |
| 6,934,056 B2 | 8/2005 | Gindele et al. |
| 7,035,461 B2 | 4/2006 | Luo et al. |
| 7,304,681 B2 | 12/2007 | Larner |
| 7,343,047 B2 | 3/2008 | Aas et al. |
| 7,525,590 B2 | 4/2009 | Murata |
| 7,542,077 B2 | 6/2009 | Miki |
| 7,755,664 B2 | 7/2010 | Kakinuma |
| 7,764,880 B2 | 7/2010 | Hamada |
| 8,224,176 B1 | 7/2012 | Pillman |
| 8,270,826 B2 * | 9/2012 | Hjelmstrom .................. 396/242 |
| 2006/0250515 A1 | 11/2006 | Koseki |
| 2007/0024931 A1 | 2/2007 | Compton et al. |
| 2007/0237514 A1 | 10/2007 | Pillman |
| 2008/0094498 A1 | 4/2008 | Mori |
| 2008/0101786 A1 | 5/2008 | Pozniansky |
| 2009/0015681 A1 | 1/2009 | Pipkorn |
| 2010/0128137 A1 | 5/2010 | Guidash |
| 2010/0310246 A1 * | 12/2010 | Campbell ....................... 396/89 |
| 2010/0315521 A1 * | 12/2010 | Kunishige et al. ......... 348/220.1 |
| 2011/0249139 A1 * | 10/2011 | Iwase et al. ................ 348/223.1 |
| 2012/0329516 A1 | 12/2012 | Prentice |

* cited by examiner

EXTENDING A DIGITAL CAMERA FOCUS RANGE

CROSS-REFERENCE TO RELATED APPLICATIONS

Reference is made to U.S. Pat. No. 8,224,176 to Pillman et al., entitled "Combined ambient and flash exposure for improved image quality," filed on Jan. 10, 2011, and to commonly assigned, co-pending U.S. patent application Ser. No. 13/167,824 to Prentice et al., entitled "Digital camera providing an extended focus range," filed on Jun. 24, 2011, both of which are incorporated herein by reference.

FIELD OF THE INVENTION

This invention pertains to the field of digital imaging and more particularly to a method for extending the focus range of a digital camera.

BACKGROUND OF THE INVENTION

Digital cameras use a lens to focus a scene onto an image sensor. Many digital cameras include an auto-focus system which can be used to automatically adjust a focus setting for the lens to achieve sharp focus for a main subject in the scene. Other digital cameras provide a manual focus capability which enable a user to manually adjust the focus setting.

All variable focus digital camera lenses will have an inherent focus distance range defined by a "near focus position" corresponding to the smallest subject distance at which the lens can be focused and a "far focus position" corresponding to the largest subject distance at which the lens can be focused. Generally, the far focus position will correspond to an infinite subject distance.

Real lenses do not focus all light rays perfectly, so that even at best focus, a point in the scene is imaged as a "blur circle" rather than a point. At any given focus distance within the focus distance range, there exists a "depth of field" corresponding to a range of subject distances around the focus distance where objects in the scene will be acceptably focused. The depth of focus will correspond to the subject distances where the size of the blur circle for the lens is less than a maximum permissible size. The maximum permissible size will correspond to the point where increasing the blur circle size begins to degrade the visual quality of the resulting image.

As is well-known in the art, the depth of field for a lens will depend on the F/# of the lens. A smaller F/# (corresponding to a larger aperture diameter) will have a smaller depth of field, while a larger F/# (corresponding to a smaller aperture diameter) will have a larger depth of field.

To reduce costs, some digital cameras use a fixed focus lens, which does not have an adjustable focus setting. Fixed focus lenses can also provide other advantages such as increased system robustness, reduced shutter lag, and reduced lens size. Fixed focus lens are generally focused at a "hyperfocal distance" for the smallest available F/#. The hyperfocal distance is the closest distance at which a lens can be focused while keeping objects at infinity acceptably sharp. Therefore, fixed focus lens generally have a depth of field that extends from infinity to some close focus distance. When the lens is at the smallest F/#, the close focus distance is typically half of the hyperfocal distance.

Sometimes a photographer may desire to capture an image of an object at a subject distance that is closer than the near focus position of the lens. This is particularly problematic for digital cameras having fixed focus lenses. While a skilled photographer may be able to manually adjust the F/# of the lens such that the desired object falls within the depth of field, such manipulations are beyond the ability and understanding of most amateur photographers.

U.S. Patent Application Publication 2010/0128137 to Guidash, entitled "Extended depth of field for image sensor," discloses a method for achieving an extended depth of field for an imaging device including an imaging sensor. The method involves capturing two different images using different F/# settings, and then forming a composite image by combining image data from the two images.

SUMMARY OF THE INVENTION

The present invention represents a method for controlling a digital camera system in order to provide an extended focus range, the digital camera system including an optical system for forming an image of a scene onto an image sensor, the optical system having an F/# that can be varied between a minimum F/# and a maximum F/#, comprising:

a) setting the F/# of the optical system to a first F/#, the first F/# being smaller than the maximum F/#;
b) capturing an evaluation image of the scene using the image sensor;
c) analyzing the captured evaluation image to determine whether a subject in the captured evaluation image is acceptably focused;
d) if the subject in the captured evaluation image is acceptably focused setting a capture F/# to be equal to the first F/#, otherwise if the subject in the captured evaluation image is not acceptably focused:
  i) increasing the F/# of the optical system;
  ii) capturing an additional evaluation image of the scene using the image sensor; and
  iii) analyzing the captured additional evaluation image to determine whether the subject in the captured additional evaluation image is acceptably focused;
  iv) repeating steps i) through iii) until the subject in the captured additional evaluation image is determined to be acceptably focused, or until the maximum F/# is reached; and
  v) determining a capture F/# responsive to the F/# determined to produce the captured additional evaluation image where the subject is acceptably focused;
e) setting the optical system to use the capture F/#;
f) capturing an archival image of the scene using the image sensor; and
g) storing the captured archival image in a storage memory.

This invention has the advantage that focused images can be captured for subjects that are closer than a nearest best focus position.

It has the additional advantage that the depth of field of the digital camera can be adaptively controlled according to the position of one or more subjects in the scene.

It has the further advantage that camera settings, including a capture F/#, an exposure time and an exposure index, can be determined to provide a preferred tradeoff between subject focus, image noise and motion blur.

It is to be understood that the attached drawings are for purposes of illustrating the concepts of the invention and may not be to scale.

DETAILED DESCRIPTION OF THE INVENTION

In the following description, a preferred embodiment of the present invention will be described in terms that would ordinarily be implemented as a software program. Those skilled in the art will readily recognize that the equivalent of such software can also be constructed in hardware. Because image manipulation algorithms and systems are well known, the present description will be directed in particular to algorithms and systems forming part of, or cooperating more directly with, the system and method in accordance with the present invention. Other aspects of such algorithms and systems, and hardware or software for producing and otherwise processing the image signals involved therewith, not specifically shown or described herein, can be selected from such systems, algorithms, components and elements known in the art. Given the system as described according to the invention in the following materials, software not specifically shown, suggested or described herein that is useful for implementation of the invention is conventional and within the ordinary skill in such arts.

Still further, as used herein, a computer program for performing the method of the present invention can be stored in a non-transitory, tangible computer readable storage medium, which can include, for example; magnetic storage media such as a magnetic disk (such as a hard drive or a floppy disk) or magnetic tape; optical storage media such as an optical disc, optical tape, or machine readable bar code; solid state electronic storage devices such as random access memory (RAM), or read only memory (ROM); or any other physical device or medium employed to store a computer program having instructions for controlling one or more computers to practice the method according to the present invention.

The invention is inclusive of combinations of the embodiments described herein. References to "a particular embodiment" and the like refer to features that are present in at least one embodiment of the invention. Separate references to "an embodiment" or "particular embodiments" or the like do not necessarily refer to the same embodiment or embodiments; however, such embodiments are not mutually exclusive, unless so indicated or as are readily apparent to one of skill in the art. The use of singular or plural in referring to the "method" or "methods" and the like is not limiting. It should be noted that, unless otherwise explicitly noted or required by context, the word "or" is used in this disclosure in a non-exclusive sense.

Because digital cameras employing imaging devices and related circuitry for signal capture and processing, and display are well known, the present description will be directed in particular to elements forming part of, or cooperating more directly with, the method and apparatus in accordance with the present invention. Elements not specifically shown or described herein are selected from those known in the art. Certain aspects of the embodiments to be described are provided in software. Given the system as shown and described according to the invention in the following materials, software not specifically shown, described or suggested herein that is useful for implementation of the invention is conventional and within the ordinary skill in such arts.

The following description of a digital camera will be familiar to one skilled in the art. It will be obvious that there are many variations of this embodiment that are possible and are selected to reduce the cost, add features or improve the performance of the camera.

Figure 1:
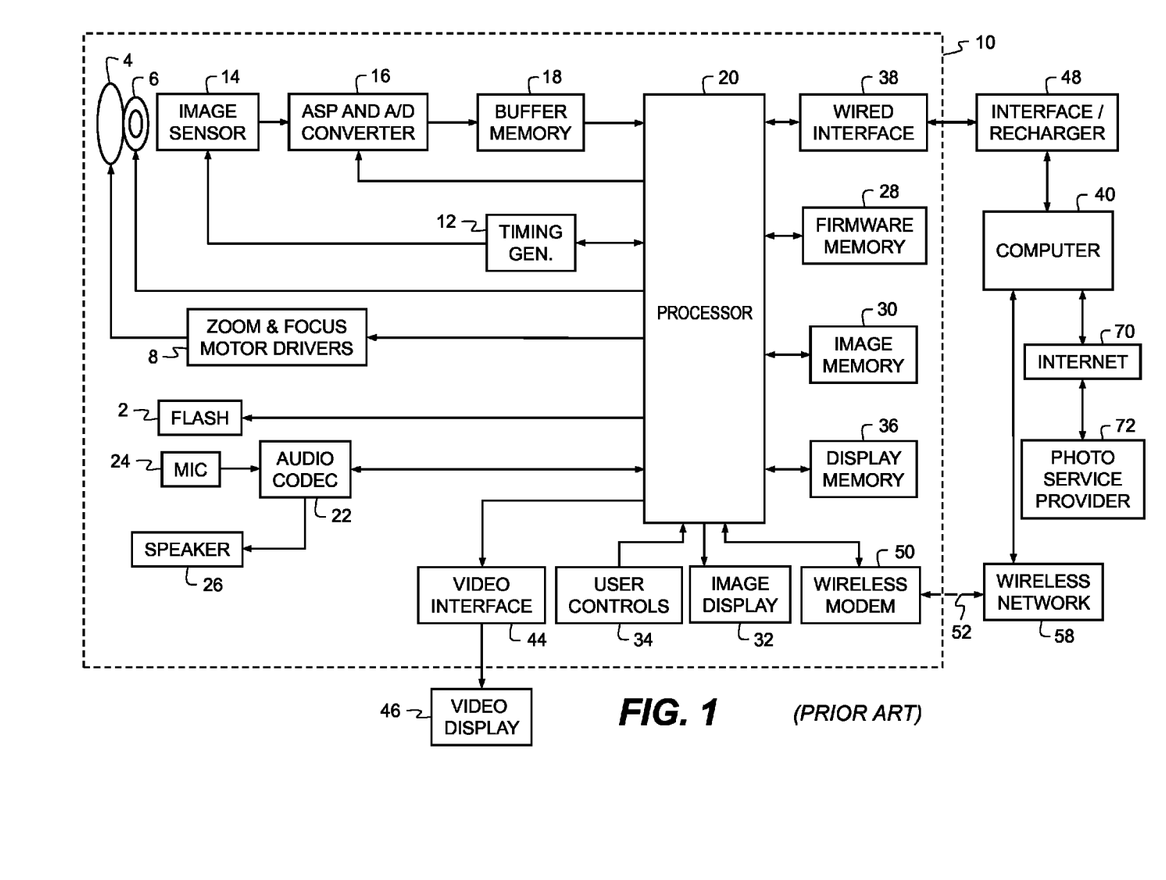
FIG. 1 is a high-level diagram showing the components of a digital camera system.

FIG. 1 depicts a block diagram of a digital photography system, including a digital camera 10 in accordance with the present invention. Preferably, the digital camera 10 is a portable battery operated device, small enough to be easily handheld by a user when capturing and reviewing images. The digital camera 10 produces digital images that are stored as digital image files using image memory 30. The phrase "digital image" or "digital image file", as used herein, refers to any digital image file, such as a digital still image or a digital video file.

In some embodiments, the digital camera 10 captures both motion video images and still images. The digital camera 10 can also include other functions, including, but not limited to, the functions of a digital music player (e.g. an MP3 player), a mobile telephone, a GPS receiver, or a programmable digital assistant (PDA).

The digital camera 10 includes a lens 4 having an adjustable aperture and adjustable shutter 6. In a preferred embodiment, the lens 4 is a zoom lens and is controlled by zoom and focus motor drives 8. The lens 4 focuses light from a scene (not shown) onto an image sensor 14, for example, a single-chip color CCD or CMOS image sensor. The lens 4 is one type optical system for forming an image of the scene on the image sensor 14. In other embodiments, the optical system may use a fixed focal length lens with either variable or fixed focus.

The output of the image sensor 14 is converted to digital form by Analog Signal Processor (ASP) and Analog-to-Digital (A/D) converter 16, and temporarily stored in buffer memory 18. The image data stored in buffer memory 18 is subsequently manipulated by a processor 20, using embedded software programs (e.g. firmware) stored in firmware memory 28. In some embodiments, the software program is permanently stored in firmware memory 28 using a read only memory (ROM). In other embodiments, the firmware memory 28 can be modified by using, for example, Flash EPROM memory. In such embodiments, an external device can update the software programs stored in firmware memory 28 using the wired interface 38 or the wireless modem 50. In such embodiments, the firmware memory 28 can also be used to store image sensor calibration data, user setting selections and other data which must be preserved when the camera is turned off. In some embodiments, the processor 20 includes a program memory (not shown), and the software programs stored in the firmware memory 28 are copied into the program memory before being executed by the processor 20.

It will be understood that the functions of processor 20 can be provided using a single programmable processor or by using multiple programmable processors, including one or more digital signal processor (DSP) devices. Alternatively, the processor 20 can be provided by custom circuitry (e.g., by one or more custom integrated circuits (ICs) designed specifically for use in digital cameras), or by a combination of programmable processor(s) and custom circuits. It will be understood that connectors between the processor 20 from some or all of the various components shown in FIG. 1 can be made using a common data bus. For example, in some embodiments the connection between the processor 20, the buffer memory 18, the image memory 30, and the firmware memory 28 can be made using a common data bus.

The processed images are then stored using the image memory 30. It is understood that the image memory 30 can be any form of memory known to those skilled in the art including, but not limited to, a removable Flash memory card, internal Flash memory chips, magnetic memory, or optical memory. In some embodiments, the image memory 30 can include both internal Flash memory chips and a standard interface to a removable Flash memory card, such as a Secure Digital (SD) card. Alternatively, a different memory card format can be used, such as a micro SD card, Compact Flash (CF) card, MultiMedia Card (MMC), xD card or Memory Stick.

The image sensor 14 is controlled by a timing generator 12, which produces various clocking signals to select rows and pixels and synchronizes the operation of the ASP and A/D converter 16. The image sensor 14 can have, for example, 12.4 megapixels (4088×3040 pixels) in order to provide a still image file of approximately 4000×3000 pixels. To provide a color image, the image sensor is generally overlaid with a color filter array, which provides an image sensor having an array of pixels that include different colored pixels. The different color pixels can be arranged in many different patterns. As one example, the different color pixels can be arranged using the well-known Bayer color filter array, as described in U.S. Pat. No. 3,971,065, "Color imaging array" to Bayer, the disclosure of which is incorporated herein by reference. As a second example, the different color pixels can be arranged as described in U.S. Pat. No. 8,139,130 to Compton and Hamilton, entitled "Image sensor with improved light sensitivity," the disclosure of which is incorporated herein by reference. These examples are not limiting, and many other color patterns may be used.

It will be understood that the image sensor 14, timing generator 12, and ASP and A/D converter 16 can be separately fabricated integrated circuits, or they can be fabricated as a single integrated circuit as is commonly done with CMOS image sensors. In some embodiments, this single integrated circuit can perform some of the other functions shown in FIG. 1, including some of the functions provided by processor 20.

The image sensor 14 is effective when actuated in a first mode by timing generator 12 for providing a motion sequence of lower resolution sensor image data, which is used when capturing video images and also when previewing a still image to be captured, in order to compose the image. This preview mode sensor image data can be provided as HD resolution image data, for example, with 1280×720 pixels, or as VGA resolution image data, for example, with 640×480 pixels, or using other resolutions which have significantly fewer columns and rows of data, compared to the resolution of the image sensor.

The preview mode sensor image data can be provided by combining values of adjacent pixels having the same color, or by eliminating some of the pixels values, or by combining some color pixels values while eliminating other color pixel values. The preview mode image data can be processed as described in commonly assigned U.S. Pat. No. 6,292,218 to Parulski, et al., entitled "Electronic camera for initiating capture of still images while previewing motion images," which is incorporated herein by reference.

The image sensor 14 is also effective when actuated in a second mode by timing generator 12 for providing high resolution still image data. This final mode sensor image data is provided as high resolution output image data, which for scenes having a high illumination level includes all of the pixels of the image sensor, and can be, for example, a 12 megapixel final image data having 4000×3000 pixels. At lower illumination levels, the final sensor image data can be provided by "binning" some number of like-colored pixels on the image sensor, in order to increase the signal level and thus the "ISO speed" of the sensor.

The zoom and focus motor drivers 8 are controlled by control signals supplied by the processor 20, to provide the appropriate focal length setting and to focus the scene onto the image sensor 14. The exposure level of the image sensor 14 is controlled by controlling the f/number and exposure time of the adjustable aperture and adjustable shutter 6, the exposure period of the image sensor 14 via the timing generator 12, and the gain (i.e., ISO speed) setting of the ASP and A/D converter 16. The processor 20 also controls a flash 2 which can illuminate the scene.

The lens 4 of the digital camera 10 can be focused in the first mode by using "through-the-lens" autofocus, as described in U.S. Pat. No.5,668,597, entitled "Electronic Camera with Rapid Automatic Focus of an Image upon a Progressive Scan Image Sensor" to Parulski et al., which is incorporated herein by reference. This is accomplished by using the zoom and focus motor drivers 8 to adjust the focus position of the lens 4 to a number of positions ranging between a near focus position to an infinity focus position, while the processor 20 determines the closest focus position which provides a peak sharpness value for a central portion of the image captured by the image sensor 14. The focus distance which corresponds to the closest focus position can then be utilized for several purposes, such as automatically setting an appropriate scene mode, and can be stored as metadata in the image file, along with other lens and camera settings.

The processor 20 produces menus and low resolution color images that are temporarily stored in display memory 36 and are displayed on the image display 32. The image display 32 is typically an active matrix color liquid crystal display (LCD), although other types of displays, such as organic light emitting diode (OLED) displays, can be used. A video interface 44 provides a video output signal from the digital camera 10 to a video display 46, such as a flat panel HDTV display. In preview mode, or video mode, the digital image data from buffer memory 18 is manipulated by processor 20 to form a series of motion preview images that are displayed, typically as color images, on the image display 32. In review mode, the images displayed on the image display 32 are produced using the image data from the digital image files stored in image memory 30.

The graphical user interface displayed on the image display 32 is controlled in response to user input provided by user controls 34. The user controls 34 are used to select various camera modes, such as video capture mode, still capture mode, and review mode, and to initiate capture of still images, recording of motion images. The user controls 34 are also used to set user processing preferences, and to choose between various photography modes based on scene type and taking conditions. In some embodiments, various camera settings may be set automatically in response to analysis of preview image data, audio signals, or external signals such as GPS, weather broadcasts, or other available signals.

In some embodiments, when the digital camera is in a still photography mode the above-described preview mode is initiated when the user partially depresses a shutter button, which is one of the user controls 34, and the still image capture mode is initiated when the user fully depresses the shutter button. The user controls 34 are also used to turn on the camera, control the lens 4, and initiate the picture taking process. User controls 34 typically include some combination of buttons, rocker switches, joysticks, or rotary dials. In some embodiments, some of the user controls 34 are provided by using a touch screen overlay on the image display 32. In other embodiments, the user controls 34 can include a means to receive input from the user or an external device via a tethered, wireless, voice activated, visual or other interface. In other embodiments, additional status displays or images displays can be used.

The camera modes that can be selected using the user controls 34 include a "timer" mode. When the "timer" mode is selected, a short delay (e.g., 10 seconds) occurs after the user fully presses the shutter button, before the processor 20 initiates the capture of a still image.

An audio codec 22 connected to the processor 20 receives an audio signal from a microphone 24 and provides an audio signal to a speaker 26. These components can be used to record and playback an audio track, along with a video sequence or still image. If the digital camera 10 is a multifunction device such as a combination camera and mobile phone, the microphone 24 and the speaker 26 can be used for telephone conversation.

In some embodiments, the speaker 26 can be used as part of the user interface, for example to provide various audible signals which indicate that a user control has been depressed, or that a particular mode has been selected. In some embodiments, the microphone 24, the audio codec 22, and the processor 20 can be used to provide voice recognition, so that the user can provide a user input to the processor 20 by using voice commands, rather than user controls 34. The speaker 26 can also be used to inform the user of an incoming phone call. This can be done using a standard ring tone stored in firmware memory 28, or by using a custom ring-tone downloaded from a wireless network 58 and stored in the image memory 30. In addition, a vibration device (not shown) can be used to provide a silent (e.g., non audible) notification of an incoming phone call.

The processor 20 also provides additional processing of the image data from the image sensor 14, in order to produce rendered sRGB image data which is compressed and stored within a "finished" image file, such as a well-known Exif-JPEG image file, in the image memory 30.

The digital camera 10 can be connected via the wired interface 38 to an interface/recharger 48, which is connected to a computer 40, which can be a desktop computer or portable computer located in a home or office. The wired interface 38 can conform to, for example, the well-known USB 2.0 interface specification. The interface/recharger 48 can provide power via the wired interface 38 to a set of rechargeable batteries (not shown) in the digital camera 10.

The digital camera 10 can include a wireless modem 50, which interfaces over a radio frequency band 52 with the wireless network 58. The wireless modem 50 can use various wireless interface protocols, such as the well-known Bluetooth wireless interface or the well-known 802.11 wireless interface. The computer 40 can upload images via the Internet 70 to a photo service provider 72, such as the Kodak EasyShare Gallery. Other devices (not shown) can access the images stored by the photo service provider 72.

In alternative embodiments, the wireless modem 50 communicates over a radio frequency (e.g. wireless) link with a mobile phone network (not shown), such as a 3GSM network, which connects with the Internet 70 in order to upload digital image files from the digital camera 10. These digital image files can be provided to the computer 40 or the photo service provider 72.

Figure 2:
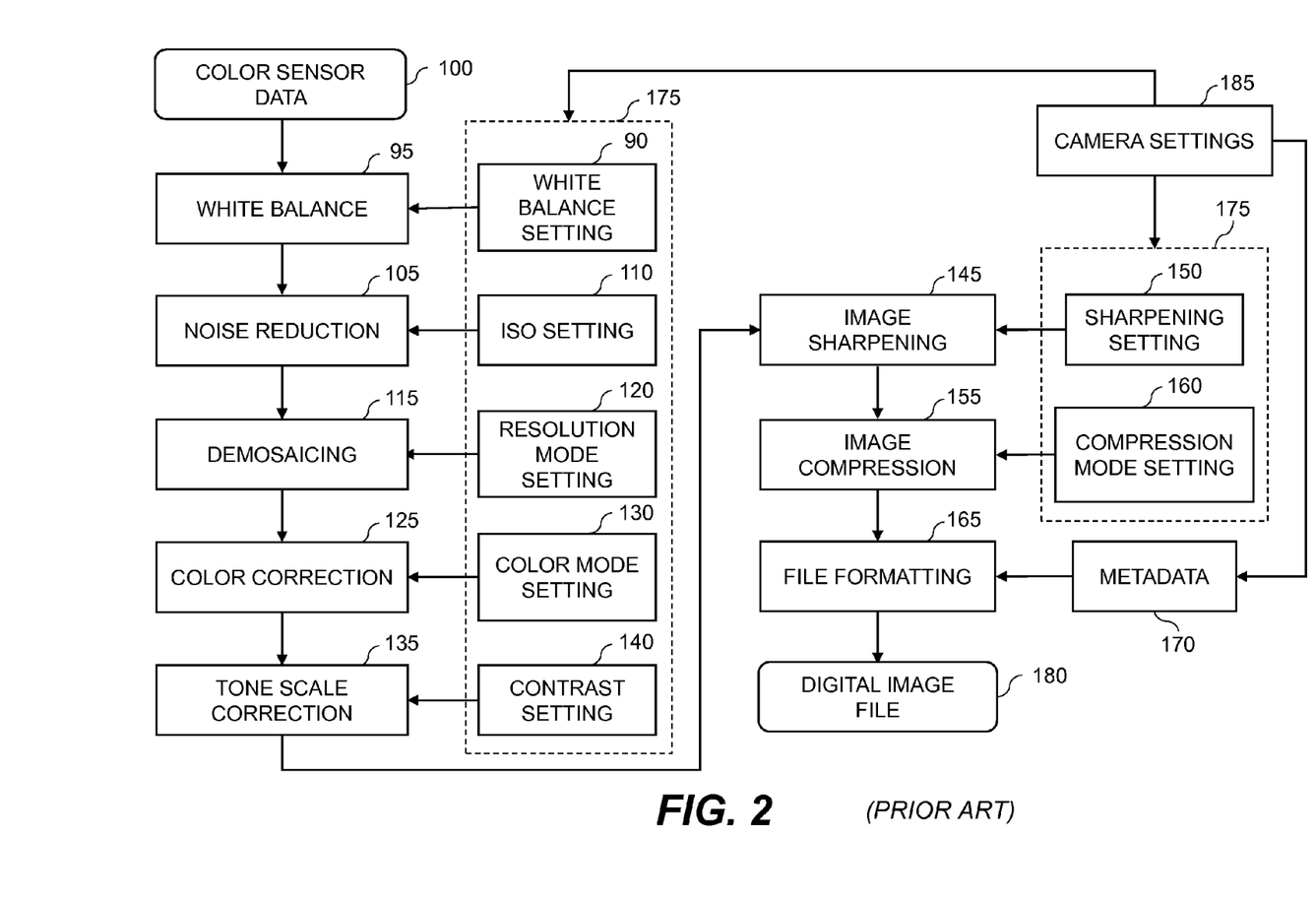
FIG. 2 is a flow diagram depicting typical image processing operations used to process digital images in a digital camera.

FIG. 2 is a flow diagram depicting image processing operations that can be performed by the processor 20 in the digital camera 10 (FIG. 1) in order to process color sensor data 100 from the image sensor 14 output by the ASP and A/D converter 16. In some embodiments, the processing parameters used by the processor 20 to manipulate the color sensor data 100 for a particular digital image are determined by various photography mode settings 175, which are typically associated with photography modes that can be selected via the user controls 34, which enable the user to adjust various camera settings 185 in response to menus displayed on the image display 32.

The color sensor data 100 which has been digitally converted by the ASP and A/D converter 16 is manipulated by a white balance step 95. In some embodiments, this processing can be performed using the methods described in commonly-assigned U.S. Pat. No. 7,542,077 to Miki, entitled "White balance adjustment device and color identification device", the disclosure of which is herein incorporated by reference. The white balance can be adjusted in response to a white balance setting 90, which can be manually set by a user, or which can be automatically set by the camera.

The color image data is then manipulated by a noise reduction step 105 in order to reduce noise from the image sensor 14. In some embodiments, this processing can be performed using the methods described in U.S. Pat. No. 6,934,056 to Gindele et al., entitled "Noise cleaning and interpolating sparsely populated color digital image using a variable noise cleaning kernel," the disclosure of which is herein incorporated by reference. The level of noise reduction can be adjusted in response to an ISO setting 110, so that more filtering is performed at higher ISO exposure index setting.

The color image data is then manipulated by a demosaicing step 115, in order to provide red, green and blue (RGB) image data values at each pixel location. Algorithms for performing the demosaicing step 115 are commonly known as color filter array (CFA) interpolation algorithms or "deBayering" algorithms. In one embodiment of the present invention, the demosaicing step 115 can use the luminance CFA interpolation method described in U.S. Pat. No. 5,652,621, entitled "Adaptive color plane interpolation in single sensor color electronic camera," to Adams et al., the disclosure of which is incorporated herein by reference. The demosaicing step 115 can also use the chrominance CFA interpolation method described in U.S. Pat. No. 4,642,678, entitled "Signal processing method and apparatus for producing interpolated chrominance values in a sampled color image signal", to Cok, the disclosure of which is herein incorporated by reference.

In some embodiments, the user can select between different pixel resolution modes, so that the digital camera can produce a smaller size image file. Multiple pixel resolutions can be provided as described in commonly-assigned U.S. Pat. No. 5,493,335, entitled "Single sensor color camera with user selectable image record size," to Parulski et al., the disclosure of which is herein incorporated by reference. In some embodiments, a resolution mode setting 120 can be selected by the user to be full size (e.g. 3,000×2,000 pixels), medium size (e.g. 1,500×1000 pixels) or small size (750×500 pixels).

The color image data is color corrected in color correction step 125. In some embodiments, the color correction is provided using a 3×3 linear space color correction matrix, as described in U.S. Pat. No. 5,189,511, entitled "Method and apparatus for improving the color rendition of hardcopy images from electronic cameras" to Parulski, et al., the disclosure of which is incorporated herein by reference. In some embodiments, different user selectable color modes can be provided by storing different color matrix coefficients in firmware memory 28 of the digital camera 10. For example, four different color modes can be provided, so that the color mode setting 130 is used to select one of the following color correction matrices:

Setting 1 (normal color reproduction)

$$\begin{bmatrix} R_{out} \\ G_{out} \\ B_{out} \end{bmatrix} = \begin{bmatrix} 1.50 & -0.30 & -0.20 \\ -0.40 & 1.80 & -0.40 \\ -0.20 & -0.20 & 1.40 \end{bmatrix} \begin{bmatrix} R_{in} \\ G_{in} \\ B_{in} \end{bmatrix} \quad (1)$$

Setting 2 (saturated color reproduction)

$$\begin{bmatrix} R_{out} \\ G_{out} \\ B_{out} \end{bmatrix} = \begin{bmatrix} 2.00 & -0.60 & -0.40 \\ -0.80 & 2.60 & -0.80 \\ -0.40 & -0.40 & 1.80 \end{bmatrix} \begin{bmatrix} R_{in} \\ G_{in} \\ B_{in} \end{bmatrix} \quad (2)$$

Setting 3 (de-saturated color reproduction)

$$\begin{bmatrix} R_{out} \\ G_{out} \\ B_{out} \end{bmatrix} = \begin{bmatrix} 1.25 & -0.15 & -0.10 \\ -0.20 & 1.40 & -0.20 \\ -0.10 & -0.10 & 1.20 \end{bmatrix} \begin{bmatrix} R_{in} \\ G_{in} \\ B_{in} \end{bmatrix} \quad (3)$$

Setting 4 (monochrome)

$$\begin{bmatrix} R_{out} \\ G_{out} \\ B_{out} \end{bmatrix} = \begin{bmatrix} 0.30 & 0.60 & 0.10 \\ 0.30 & 0.60 & 0.10 \\ 0.30 & 0.60 & 0.10 \end{bmatrix} \begin{bmatrix} R_{in} \\ G_{in} \\ B_{in} \end{bmatrix} \quad (4)$$

In other embodiments, a three-dimensional lookup table can be used to perform the color correction step 125.

The color image data is also manipulated by a tone scale correction step 135. In some embodiments, the tone scale correction step 135 can be performed using a one-dimensional look-up table as described in U.S. Pat. No. 5,189,511, cited earlier. In some embodiments, a plurality of tone scale correction look-up tables is stored in the firmware memory 28 in the digital camera 10. These can include look-up tables which provide a "normal" tone scale correction curve, a "high contrast" tone scale correction curve, and a "low contrast" tone scale correction curve. A user selected contrast setting 140 is used by the processor 20 to determine which of the tone scale correction look-up tables to use when performing the tone scale correction step 135.

The color image data is also manipulated by an image sharpening step 145. In some embodiments, this can be provided using the methods described in U.S. Pat. No. 6,192,162 entitled "Edge enhancing colored digital images" to Hamilton, et al., the disclosure of which is incorporated herein by reference. In some embodiments, the user can select between various sharpening settings, including a "normal sharpness" setting, a "high sharpness" setting, and a "low sharpness" setting. In this example, the processor 20 uses one of three different edge boost multiplier values, for example 2.0 for "high sharpness", 1.0 for "normal sharpness", and 0.5 for "low sharpness" levels, responsive to a sharpening setting 150 selected by the user of the digital camera 10.

The color image data is also manipulated by an image compression step 155. In some embodiments, the image compression step 155 can be provided using the methods described in U.S. Pat. No. 4,774,574, entitled "Adaptive block transform image coding method and apparatus" to Daly et al., the disclosure of which is incorporated herein by reference. In some embodiments, the user can select between various compression settings. This can be implemented by storing a plurality of quantization tables, for example, three different tables, in the firmware memory 28 of the digital camera 10. These tables provide different quality levels and average file sizes for the compressed digital image file 180 to be stored in the image memory 30 of the digital camera 10. A user selected compression mode setting 160 is used by the processor 20 to select the particular quantization table to be used for the image compression step 155 for a particular image.

The compressed color image data is stored in a digital image file 180 using a file formatting step 165. The image file can include various metadata 170. Metadata 170 is any type of information that relates to the digital image, such as the model of the camera that captured the image, the size of the image, the date and time the image was captured, and various camera settings, such as the lens focal length, the exposure time and f-number of the lens, and whether or not the camera flash fired. In a preferred embodiment, all of this metadata 170 is stored using standardized tags within the well-known Exif-JPEG still image file format. In a preferred embodiment of the present invention, the metadata 170 includes information about various camera settings 185, including the photography mode settings 175.

Figure 3:
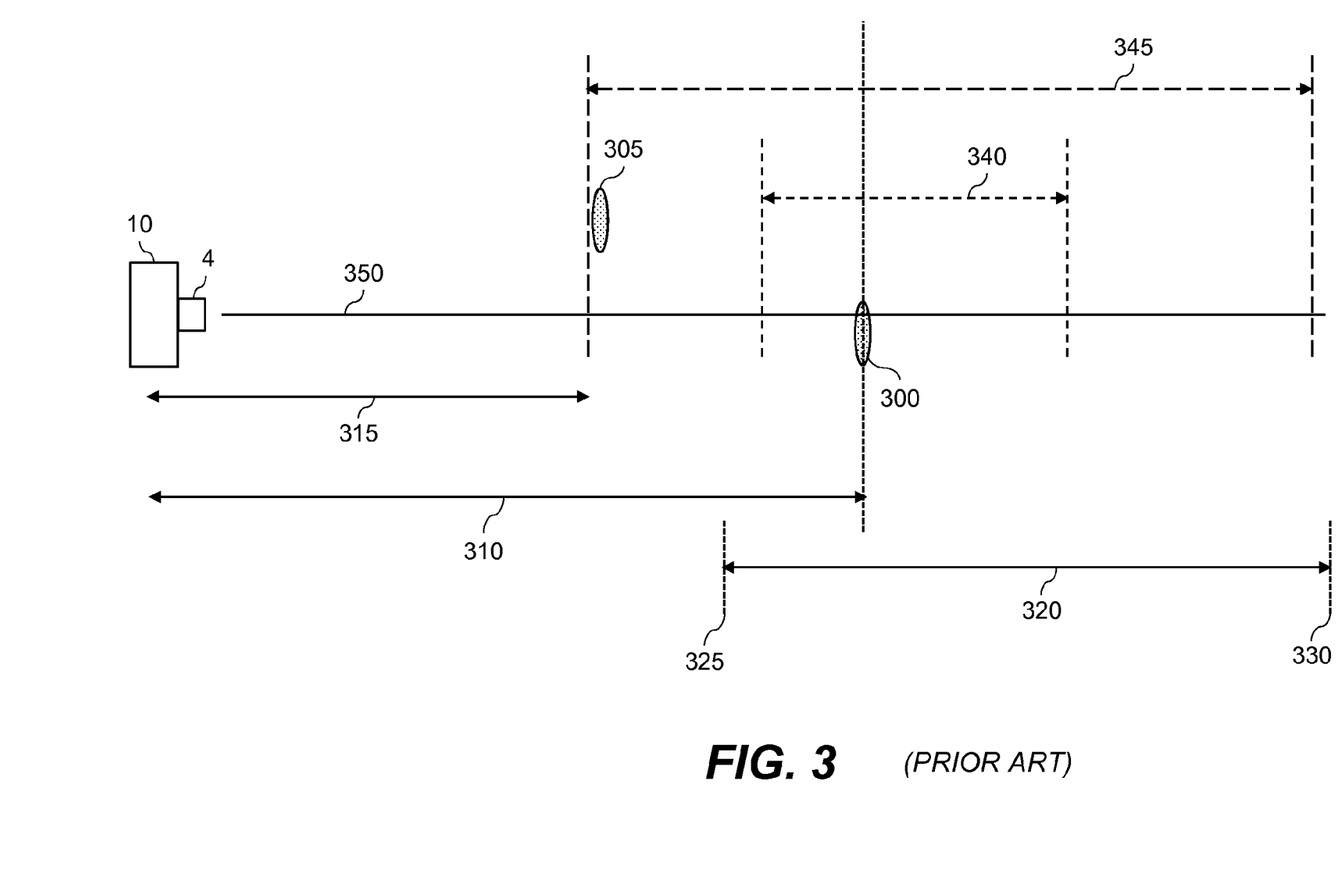
FIG. 3 shows an illustrative example where a digital camera is used to photograph a scene containing first and second subjects.

FIG. 3 shows an illustrative example where digital camera 10 with lens 4 and optical axis 350 is used to photograph a scene containing first subject 300 at a first subject distance 310 and a second subject 305 at a second subject distance 315. In this embodiment, the lens 4 is a variable focus lens having an adjustable best focus position. The best focus position is the subject distance having the sharpest focus for a particular focus setting. The lens 4 has an associated best focus position range 320 corresponding to the range of subject distances over which the lens 4 can be focused. The best focus position range 320 extends from a nearest best focus position 325 corresponding to the shortest subject distance at which the lens 4 can be focused to a farthest best focus position 330 corresponding to a longest subject distance at which the lens 4 can be focused. Generally, the farthest best focus position 330 will correspond to an infinite subject distance.

For a given best focus position, the lens 4 will have a depth of field corresponding to the range of subject distances that will be in focus. As is well-known in the art, the depth of field will be a function of the F/# setting of the lens 4. In the illustrated example, the lens 4 is focused on the first subject 300 such that the first subject distance 310 corresponds to the best focus position. At a first F/# setting the lens 4 will have a first depth of field 340, and at a second larger F/# setting the lens 4 will have a second depth of field 345. In this illustrative example, the second subject 305 falls outside of the first depth of field 340, and will therefore be out-of-focus at the first F/# setting. However, the second subject 305 falls within the second depth of field 345, and will therefore be acceptably focused at the second F/# setting.

Figure 4:
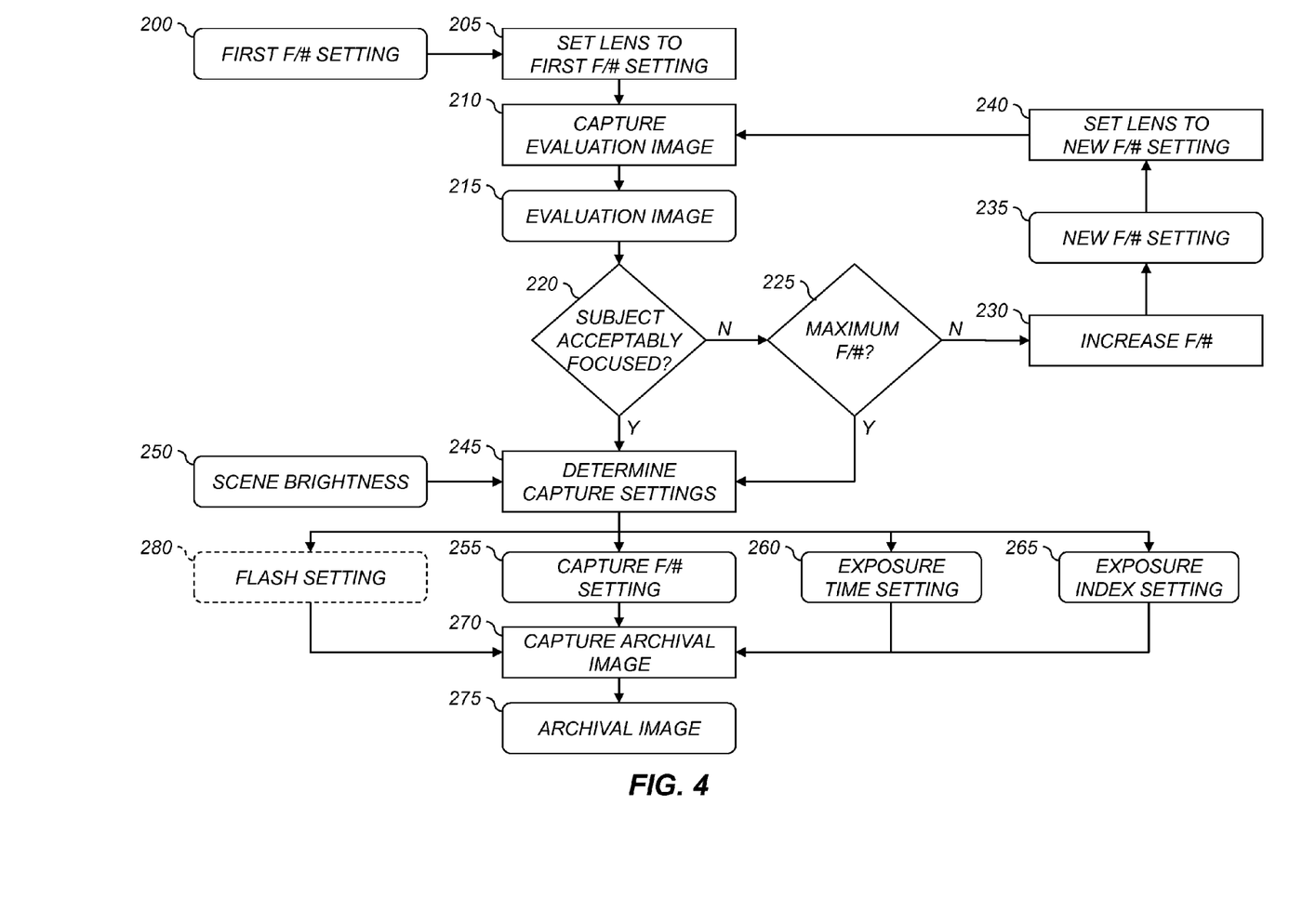
FIG. 4 is a flow diagram illustrating a method for controlling a digital camera to provide an extended focus range according to an embodiment of the present invention.

The present invention provides a method for automatically adjusting the F/# setting for a digital camera 10 (FIG. 1) such that a subject being photographed will be acceptably focused. FIG. 4 shows a flowchart illustrating a preferred embodiment of a method that can be implemented using processor 20 (FIG. 1). The lens 4 (FIG. 1) of the digital camera 10 has an aperture that can be adjusted between a minimum F/# setting and a maximum F/# setting.

First, a set lens to first F/# step 205 is used to set the lens 4 to use a first F/# setting 200 that is smaller than the maximum F/# setting. In a preferred embodiment, the first F/# setting 200 corresponds to the minimum F/# setting. Use of the minimum F/# setting has the advantage that the lens will collect the maximum amount of light for a particular exposure time, thereby enabling the use of the lowest possible exposure index and producing digital images having the minimum level of image noise. However, the minimum F/# setting has the smallest depth of field, and therefore only a relatively narrow range of subject distances will be in focus.

A capture evaluation image step 210 is used to capture an evaluation image 215 using the first F/# setting 200. In some embodiments the capture evaluation image step 210 is performed in response to activation of an image capture control such as a shutter button. In other embodiments, the capture evaluation image step 210 step is performed when the digital camera 10 (FIG. 1) enters a preview mode, such as by a partial activation of an image capture control (e.g., partial depression of the shutter button).

For digital cameras 10 where the lens 4 (FIG. 1) has a variable focus position, an auto-focus operation (or a manual focus operation) is preferably used to adjust the focus setting of the lens 4 before the evaluation image 215 is captured. Methods for performing auto-focus operations are well-known in the art. In a preferred embodiment, the auto-focus operation adjusts the focus setting until an object in the scene that it believes to be the main subject is optimally focused. In some embodiments, the auto-focus operation selects the closest object in the scene to be the main subject. In other embodiments, the auto-focus operation selects the object nearest to the center of the image to be the main subject.

For some scenes, the main subject selected by the auto-focus operation will be within the best focus position range 320 (FIG. 3) of the lens 4. In this case, the auto-focus operation will adjust the focus position such that the main subject is located at the best focus position. For other scenes, the main subject may fall outside of the best focus position range 320. In this case, the auto-focus operation will generally set the focus position to the nearest best focus position 325 (FIG. 3) and the main subject will be out of focus to some degree.

A subject acceptably focused test 220 is used to automatically evaluate the evaluation image 215 to determine whether a subject in the evaluation image is acceptably focused. Any method known in the art for evaluating whether an object in a digital image is in focus can be used in accordance with the present invention. A wide variety of such methods have been developed for use in auto-focus operations, as well as for automatic image quality estimation operations. In some embodiments, the subject that is being evaluated is the subject that is believed to be the main subject in the scene.

U.S. Pat. No. 7,343,047 to Aas et al., entitled "Systems and methods for arriving at an auto focus figure of merit," discloses a method for assessing a captured digital image to determine a figure of merit providing an indication of whether a region of the digital image is properly focused. This method can easily be adapted to be used by the subject acceptably focused test 220 in accordance with the present invention.

U.S. Pat. No. 6,535,636 to Savakis et al., entitled "Method for automatically detecting digital images that are undesirable for placing in albums," discloses a method for estimating the image quality of digital image by assessing various technical image quality attributes including a sharpness attribute. The sharpness attribute is determined by calculating gradients of the sharpest edges in an image region. Such a method can be used in accordance with the present invention by estimating a sharpness attribute in a local image region corresponding to the subject. In one embodiment, if the sharpness attribute exceeds a predefined threshold, the subject can be determined to be acceptably focused.

In other embodiments, a change in the sharpness attribute can be determined that results from a change in the F/# of the lens 4. As the F/# is increase, the sharpness attribute determined for a particular subject will gradually increase until the subject is in focus. In this case, the subject can be determined to be acceptably focused when the change in the sharpness attribute for a given increase in the F/# is below a predefined threshold.

In some embodiments, the subject whose focus characteristics are evaluated is the subject believed to be the main subject in the scene. The main subject can be the subject identified by the auto-focus algorithm. Alternately, the evaluation image 215 can be analyzed with a main subject detection algorithm. Any main subject detection algorithm known in the art can be used in accordance with the present invention. One example of a main subject detection algorithm that can be used in accordance with the present invention is described in U.S. Pat. No. 6,282,317 to Luo et al., entitled "Method for automatic determination of main subjects in photographic images," which is incorporated herein by reference.

In other cases, the focus characteristics for one or more additional subjects can also be evaluated. For example, the first subject 300 in FIG. 3 can be assumed to be the main subject in the scene. In this case, the first subject 300 falls within the best focus position range 320, and will therefore be in focus following the auto-focus operation. However, the second subject 305 is at second subject distance 315, which is outside of the best focus position range 320. In some embodiments, the subject acceptably focused test 220 can evaluate the focus characteristics of one or more foreground objects that are detected in the scene, such as the second subject 305.

Subjects appropriate for analyzing with the subject acceptably focused test 220 can be identified using any method known in the art. For example, a face detection algorithm can be used to identify the locations of any faces present in the evaluation image 215. Any face detection algorithm known in the art can be used in accordance with the present invention. For example, a method for detecting faces in a digital image that can be used in accordance with the present invention is described by Romdhani et al. in the article "Computationally Efficient Face Detection" (Proc. $8^{th}$ International Conference on Computer Vision, pp. 695-700, 2001). Similarly, a method for detecting persons in a digital image is taught in U.S. Pat. No. 6,697,502 to Luo, entitled "Image processing method for detecting human figures in a digital image assets." A general object detection algorithm can also be used to identify foreground objects in the evaluation image 215 that would be appropriate to be used as subjects. An example of an object detection algorithm that can be used in accordance with the present invention is described in U.S. Pat. No. 7,035,461 to Luo et al., entitled "Method for Detecting Objects in Digital images."

The following discussion will assume that a single subject is identified whose focus characteristics are to be evaluated. However, it will be obvious to one skilled in the art that the method can easily be generalized to evaluate the focus characteristics for any number of subjects.

If the subject acceptably focused test 220 determines that the subject is acceptably focused, the method proceeds to a determine capture settings step 245, which will be discussed below. If the subject acceptably focused test 220 determines that the subject is not acceptably focused, the method proceeds to a maximum F/# test 225.

The maximum F/# test 225 evaluates the current F/# of the lens to determine whether it is already at maximum allowable F/#. In a preferred embodiment, the maximum allowable F/# is the maximum F/# that the lens 4 (FIG. 1) is physically able to achieve. In other cases, the maximum F/# can be determined to provide a preferred tradeoff between subject focus and image noise responsive to a determined scene brightness. For example, if the scene brightness is low, the maximum F/# can be limited to a value lower than the physical limit in order to limit the noise in the captured digital image to an acceptable level. In some embodiments, the preferred tradeoff can also account for motion blur.

If the maximum F/# test 225 determines that the current F/# of the lens is already at the maximum allowable F/#, the method proceeds to the determine capture settings step 245. Otherwise, the method proceeds to an increase F/# step 230, which increase the F/# to determine a new F/# setting 235. In a preferred embodiment, the increase F/# step 230 increases the F/# according to a predefined sequence. For example, the predefined sequence can increase the F/# in one-stop increments (e.g., F/2.8,F/4,F/5.6,F/8,F/11 and F/16). It will be obvious that other fixed increments can also be used such as one-third or one-half stop increments. In other cases, the F/#s in the predefined sequence can be selected according to other criteria. For example, they can be selected such that the depth of field is increased by uniform increments.

A set lens to new F/# setting step 235 sets the lens 4 to use the new F/# setting 235. Execution then returns to the capture evaluation image step 210, which captures a new evaluation image 215. This process is repeated until the subject acceptably focused test 220 determined that the subject in the captured evaluation image 215 is acceptably focused, or until the maximum F/# test 225 determines that maximum allowable F/# has been reached.

Next, the determine capture settings step 245 is used to determine a set of capture setting that will be used to capture an archival image 275. The determine capture settings step 245 typically determines the capture settings responsive to a measured scene brightness 250. In some embodiments, the measured scene brightness 250 can be determined by analyzing the evaluation image 215. In other embodiments, the scene brightness 250 can be determined using a separate scene brightness sensor.

The capture settings will generally include a capture F/# setting 255, an exposure time setting 260 and an exposure index setting 265. For digital cameras 10 including a flash 2 (FIG. 1), the capture settings can also include an optional flash setting 280. In a preferred embodiment, the capture F/# setting 255 will be set to the F/# determined to produce an evaluation image where the subject is acceptably focused. The exposure time setting 260 and the exposure index setting 265 can then be selected to produce a properly exposed image given the scene brightness 250.

For low scene brightness levels, using the F/# determined to produce an evaluation image where the subject is acceptably focused can result in excessively noisy images due to a high exposure index setting 265, or can result in excessively blurry images due to a long exposure time setting 260. For digital cameras 10 including a flash 2 if it is determined that the exposure time setting 260 and the exposure index setting 265 needed to produce a properly exposed image would produce excessive blur or noise artifacts, the flash setting 280 can be set to automatically fire the flash in order to augment the available light.

In some cases, it may be desirable to reduce the capture F/# setting to a level below the F/# determined to produce an evaluation image to provide a preferred tradeoff between subject focus, image noise and motion blur, or some combination of these factors. Methods for determining tradeoffs between image capture settings are well-known in the art. For example, U.S. Pat. No. 8,224,176 to Pillman et al., entitled "Combined ambient and flash exposure for improved image quality," which is incorporated herein by reference, teaches a method for determining capture settings that tradeoff between noise artifacts and blur artifacts. Defocus is one particular form of a blur artifact. This method can therefore be generalized to determine desired capture settings based on the amount of defocus that would result from reducing the capture F/# setting 255 below the F/# setting determined to produce an evaluation image where the subject is acceptably focused.

A capture archival image step 270 is used to capture an archival image 275 using the capture settings determined by the determine capture settings step 245. In some embodiments, the capture archival image step 270 is performed in response to a user activating an image capture control. For example, the capture archival image step 270 can be performed in response to a user fully depressing a shutter button. The archival image 275 is then processed according to the method shown in FIG. 2 and stored in image memory 30 (FIG. 1).

In some embodiments, the method of FIG. 4 is used for scenes where the main subject is determined to be at a subject distance that is closer than the nearest best focus position 325 (FIG. 3) such that the auto-focus operation is incapable of adjusting the focus setting to focus on the main subject. This can be particularly useful when the digital camera 10 is set to operate in a macro mode where the subject distance will typically be relatively short.

In some embodiments, the lens 4 is a fixed focus lens which does not have an adjustable focus distance. In this case, if the subject has a subject distance that is shorter than the nearest subject distance associated depth of field for the minimum F/# setting, the method of FIG. 4 can be used to extend the depth of field by increasing the F/# setting to a value having a corresponding depth of field large enough to include the subject distance.

In some embodiments, the method of FIG. 4 is implemented in a standalone digital camera 10, such as a consumer point-and-shoot digital camera, or a digital SLR. In other embodiments, the method is implemented as a software application that can be loaded onto a programmable communication device (e.g., a smart phone) that includes a digital camera system. Those skilled in the art will recognize that the method of the present invention can be used to control any digital camera system including an optical system with an adjustable F/#.

A computer program product can include one or more non-transitory, tangible, computer readable storage medium, for example; magnetic storage media such as magnetic disk (such as a floppy disk) or magnetic tape; optical storage media such as optical disk, optical tape, or machine readable bar code; solid-state electronic storage devices such as random access memory (RAM), or read-only memory (ROM); or any other physical device or media employed to store a computer program having instructions for controlling one or more computers to practice the method according to the present invention.

The invention has been described in detail with particular reference to certain preferred embodiments thereof, but it will be understood that variations and modifications can be effected within the spirit and scope of the invention.

PARTS LIST 2 flash
4 lens
6 adjustable aperture and adjustable shutter
8 zoom and focus motor drives
10 digital camera 12 timing generator
14 image sensor
16 ASP and A/D Converter
18 buffer memory
20 processor
22 audio codec
24 microphone
26 speaker
28 firmware memory
30 image memory
32 image display
34 user controls
36 display memory
38 wired interface
40 computer
44 video interface
46 video display
48 interface/recharger
50 wireless modem
52 radio frequency band
58 wireless network
70 Internet
72 photo service provider
90 white balance setting
95 white balance step
100 color sensor data
105 noise reduction step
110 ISO setting
115 demosaicing step
120 resolution mode setting
125 color correction step
130 color mode setting
135 tone scale correction step
140 contrast setting
145 image sharpening step
150 sharpening setting
155 image compression step
160 compression mode setting
165 file formatting step
170 metadata
175 photography mode settings
180 digital image file
185 camera settings
200 first F/# setting
205 set lens to first F/# setting step
210 capture evaluation image step
215 evaluation image
220 subject acceptably focused test
225 maximum F/# test
230 increase F/# step
235 new F/# setting
240 set lens to new F/# setting step
245 determine capture settings step
250 scene brightness
255 capture F/# setting
260 exposure time setting
265 exposure index setting
270 capture archival image step
275 archival image
280 flash setting
300 first subject
305 second subject
310 first subject distance
315 second subject distance
320 best focus position range
325 nearest best focus position
330 farthest best focus position
340 first depth of field
345 second depth of field
350 optical axis

The invention claimed is:

1. A method for providing an extended focus range, comprising:
   a) setting an F/# of an optical system of a digital camera to a first F/#, wherein F/# represents the ratio of the optical system's focal length to aperture size, and wherein the first F/# is larger than or equal to a minimum F/# of the optical system and smaller than or equal to a maximum F/# of the optical system;
   b) capturing an evaluation image of a scene using an image sensor of the optical system;
   c) analyzing the captured evaluation image to determine whether a subject in the captured evaluation image is acceptably focused;
   d) setting a capture F/# to be equal to the first F/# if the subject in the captured evaluation image is acceptably focused; otherwise
      i) increasing the F/# of the optical system;
      ii) capturing an additional evaluation image of the scene using the image sensor and the increased F/#,
      iii) analyzing the captured additional evaluation image to determine whether the subject in the captured additional evaluation image is acceptably focused,
      iv) repeating steps i) through iii) until the subject in the captured additional evaluation image is determined to be acceptably focused, or until the maximum F/# is reached, and
      v). determining a capture F/# responsive to step iv);
   e) setting the optical system to use the capture F/#;
   f) capturing an archival image of the scene using the image sensor and the capture F/#; and
   g) storing the captured archival image in a storage memory.

2. The method of claim 1, wherein the subject is determined to be acceptably focused by estimating a sharpness attribute.

3. The method of claim 2, wherein the subject is determined to be acceptably focused if the sharpness attribute exceeds a predefined threshold.

4. The method of claim 2, wherein the subject is determined to be acceptably focused by evaluating a change in the sharpness attribute resulting from a change in the F/# of the optical system.

5. The method of claim 1, wherein the first F/# is the minimum F/#.

6. The method of claim 1, wherein the optical system is a fixed focus optical system.

7. The method of claim 1, wherein the optical system is a variable focus optical system, and wherein steps a) through d) are performed when the optical system is at a nearest focus position corresponding to an object distance larger than the distance to the subject.

8. The method of claim 1, further including an electronic flash, and wherein the electronic flash is automatically fired responsive to the determined F/# and a determined scene brightness.

9. The method of claim 1, wherein the maximum F/# is determined to provide a preferred tradeoff between subject focus and image noise responsive to a determined scene brightness.

10. The method of claim 9, wherein the preferred tradeoff also accounts for motion blur.

11. The method of claim 1, wherein the capture F/# determined in step v) is equal to the F/# determined to produce the captured additional evaluation image where the subject is acceptably focused.

12. The method of claim 1, wherein the capture F/# determined in step v) is determined to provide a preferred tradeoff between subject focus and image noise responsive to a determined scene brightness and the F/# determined to produce the captured additional evaluation image where the subject is acceptably focused.

13. The method of claim 12, wherein the preferred tradeoff also accounts for motion blur.

14. The method of claim 1, wherein the subject is automatically identified by analyzing the captured evaluation image using an object detection process.

15. The method of claim 1, wherein the subject is the main subject in the scene.

16. The method of claim 15, wherein the main subject is identified by a main subject detection process.

17. The method of claim 1, wherein the optical system is focused on another subject in the scene that is different from the subject that is being analyzed to determine whether it is acceptably focused.

18. The method of claim 1, wherein the captured evaluation images are analyzed to determine whether a plurality of subjects are acceptably focused.

19. The method of claim 1, wherein the F/# of the optical system is increased in step i) according to a predefined F/# sequence.

20. The method of claim 19, wherein the F/#s in the predefined F/# sequence are separated by a fixed number of exposure stops.

21. The method of claim 1, wherein the method for capturing a focused digital image is performed when the digital camera system is operating in a macro imaging mode.

22. The method of claim 1, wherein steps a) through e) are performed in response to partial activation of an image capture control by a user, and steps f) and g) are performed in response to full activation of the image capture control.

23. The method of claim 1, wherein steps a) through e) are performed in response to entering an image preview mode, and steps f) and g) are performed in response to activation of an image capture control.

* * * * *